Oct. 21, 1941.   W. W. HARGRETT   2,259,635
FISHING PLUG
Filed Feb. 28, 1940

INVENTOR.
Wilson W. Hargrett
BY
Gerald J. Baldwin
ATTORNEY.

Patented Oct. 21, 1941

2,259,635

UNITED STATES PATENT OFFICE 2,259,635

FISHING PLUG

Wilson W. Hargrett, Wyandotte, Mich.

Application February 28, 1940, Serial No. 321,224

2 Claims. (Cl. 43—46)

This invention relates to improvements in fishing plugs, and is a continuation in part of my Patent No. 2,200,670. It is an object of the invention to provide a fishing plug having its front extremity transversely inclined and of concave form, and an action plate seated in the concavity and projecting on one side of the plug to impart a zigzag motion to the latter as it is drawn through the water.

Another object of the invention is to provide a fishing plug which is cheap and simple to manufacture, and which includes a plug and an action plate attached thereto by a fastening member which at its front extremity is provided with means for attachment of a line thereto.

Having thus briefly and broadly stated some of the objects and advantages of the invention I will now proceed to describe it in detail with the aid of the accompanying drawing, in which.

Figure 1:
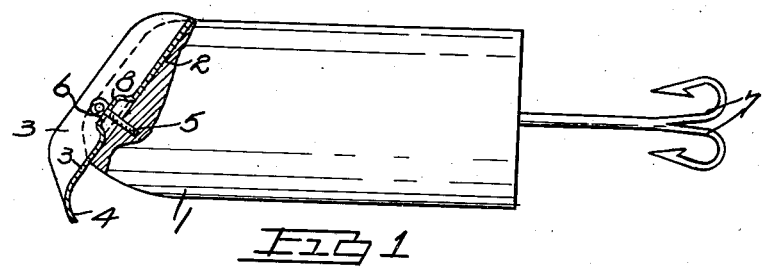
Figure 1 is a side view of the invention showing the front portion of the action plate and the plug in section.

Referring to the drawing, 1 designates a plug, which is preferably circular in cross section, and is transversely inclined and has a transverse concavity formed across its front extremity to form a seat 2 to receive an action plate 3. This plate terminates at one extremity substantially flush with one side of the plug 1, and its opposite extremity projects beyond the other side of the plug and terminates in a rearwardly flexed tongue 4.

The action plate 3 is secured to the plug 1 by a screw 5 which terminates at its front extremity in an eye 6 to which a line (not shown) may be suitably attached in order to pull the plug through the water.

Figure 2:
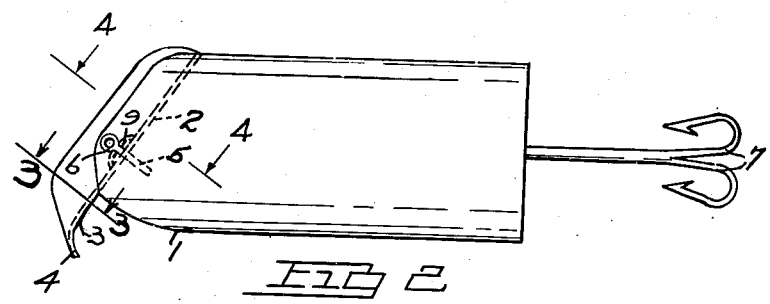
Figure 2 is a side elevation showing a slightly modified form of action plate.
Figure 3:
Figure 3 is a section on the action plate on the line 3—3 of Figure 2.
Figure 4:
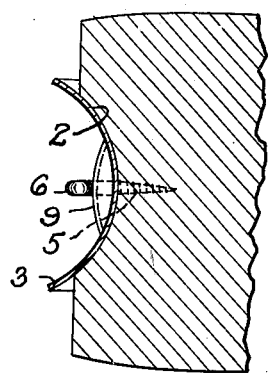
Fig. 4 is an enlarged transverse section on the line 4—4 of Fig. 2.

In the arrangement shown in Figure 1 a forwardly projecting boss 8 is formed substantially centrally of the length and width of the plate 3 and integral therewith. This boss is centrally apertured for the passage of the screw 5. In the modification shown in Figure 2 a dished washer 9 is provided for the eye 6 of the screw 5 to rest against and is shaped so that its periphery bears against the curved outer face of the action plate 3.

The fishing plug may be provided with any desired type of hooks 7 which may be carried by the plug in any preferred manner.

It will thus be seen that the front extremity of the plug 1 is transversely inclined and concave to receive a similarly formed action plate 3, and that the leading extremity of the plate projects beyond the plug where it terminates in a tongue 4 which is rearwardly flexed to shed water with which it comes in contact. It is found that this form of plug and action plate is very effective as motion through the water imparts a zigzag motion to the plug which attracts fish.

While in the foregoing the preferred embodiments of the invention have been described and shown it is understood that further alterations and modifications may be made thereto provided they fall within the scope of the appended claims.

What I claim is:

1. In an arrangement of the character described, the combination of a substantially circular plug having its front extremity transversely inclined and a concave groove of uniform depth and radius formed centrally and longitudinally in and across the entire inclined extremity, a transversely curved action plate seated in said groove having its longitudinal margins projecting forwardly a uniform distance from the front of the plug throughout substantially the entire height of the latter, one extremity of the action plate terminating substantially flush with the trailing side of the inclined extremity of the plug, an integral tongue formed on the opposite extremity of the plate and extending laterally beyond the leading side of the inclined extremity of the plug, said tongue being gradually flattened towards its outer transverse margin and rearwardly flexed, and means securing said plate to said plug including means for attachment of a line thereto.

2. In an arrangement of the character described, the combination set forth in claim 1 including a forwardly projecting apertured boss formed integral with the plate substantially centrally thereof through which the fastening means extends, a portion of said fastening means bearing against the outer face of said boss.

WILSON W. HARGRETT.